United States Patent [19]

Yang

[11] Patent Number: 5,169,099

[45] Date of Patent: Dec. 8, 1992

[54] ADJUSTABLE OVERHEAD CONDUCTOR CARRIER

[76] Inventor: Chin-Hui Yang, 4F., No. 2, Lane 409, Chung Cheng Rd., Hsin Tien City, Taipei Hsien, Taiwan

[21] Appl. No.: 808,817

[22] Filed: Dec. 17, 1991

[51] Int. Cl.$^5$ ............................................. F16L 3/00
[52] U.S. Cl. ................................. 248/49; 248/68.1; 248/58
[58] Field of Search ................. 248/49, 68.1, 58

[56] References Cited

U.S. PATENT DOCUMENTS

| | | | |
|---|---|---|---|
| 2,891,750 | 6/1959 | Bergquist | 248/68.1 X |
| 3,598,349 | 8/1971 | Drake | 248/68.1 X |
| 3,960,350 | 6/1976 | Tardoskegyi | 248/68.1 X |

FOREIGN PATENT DOCUMENTS 2436318  5/1980  France .................................. 248/49

Primary Examiner—Alvin C. Chin-Shue
Attorney, Agent, or Firm—Varndell Legal Group

[57] ABSTRACT

An overhead conductor carrier, comprising a conductor carrying frame assembly for carrying conductors which comprises two rails connected by a plurality of extension links therebetween, and a suspension gear for suspending said conductor carrying frame assembly from the ceiling of a factory building which comprises a U-shaped cross bar secured to the ceiling and two suspension rods movably hanging on said U-shaped cross bar, and wherein said two rails can be bilaterally extended outwards to increase the holding space therebetween according to the quantity of conductors to be carried.

4 Claims, 5 Drawing Sheets

ADJUSTABLE OVERHEAD CONDUCTOR CARRIER

BACKGROUND OF THE INVENTION

The present invention relates to overhead conductor carriers and relates more particularly to an overhead conductor carrier suspended from a ceiling for carrying conductors which can be conveniently adjusted according to the amount of conductors to be carried.

In factory buildings, conductors which are used to provide a factory with electricity are generally arranged overhead. Fixed type of conductor carriers are commonly used in carrying overhead conductors. A conductor carrier can be a framework or U-shaped bracket fixedly secured to the ceiling of a factory building through the process of welding or by fastening means. Fixedly welded a framework to the ceiling may destroy the internal sense of beauty of a factory building. Because either type of conventional conductor carriers are made in fixed structure and not adjustable, they occupy much space during delivery and difficult to install. Once a conductor carrier is fastened in place, it can not be adjusted according to the quantity of conductors to be carried. Sometimes two or more conductor carriers should be connected together for holding a big bundle of conductors.

SUMMARY OF THE INVENTION

The present invention has been accomplished to eliminate the aforesaid disadvantages. It is therefore an object of the present invention to provide an overhead conductor carrier which can be conveniently adjusted according to the quantity of conductors to be carried. It is another object of the present invention to provide an overhead conductor carrier which can be collapsed to reduce space occupation during its delivery. It is still another object of the present invention to provide an overhead conductor carrier which is easy to assemble, convenient to install, and inexpensive to manufacture. It is still another object of the present invention to provide an overhead conductor carrier which does not destroy the sense of beauty of a factory building to which it is fastened.

According to the present invention, an overhead conductor carrier is generally comprised of a conductor carrying frame assembly suspended from the ceiling of a factory building by a suspension gear. The conductor carrying frame assembly is comprised of two symmetrical rails connected by a plurality of extension links. The extension links each is comprised of two rods that slide one inside the other. By extending the extension links, the size of the conductor carrying frame assembly is expanded for carrying more conductors. The suspension gear is comprised of an U-shaped cross rod fastened to the ceiling of a factory building, and two suspension rods movably hanging on the U-shaped cross rod for holding the conductor carrying frame assembly. By moving the suspension rods on the U-shaped cross rod, the size of the suspension gear is adjusted according to the arrangement of the conductor carrying frame assembly.

In an alternate form of the present invention, the conductor carrying frame assembly is consisted of two L-shaped plates that lie upon and extend beyond a part of each other. By loosening adjusting screws which secure the L-shaped plates together, the L-shaped plates can be bilaterally extended outwards so that the holding space of the conductor carrying frame assembly is adjusted.

DETAILED DESCRIPTION OF THE PREFERRED EMBODIMENT

Figure 1:
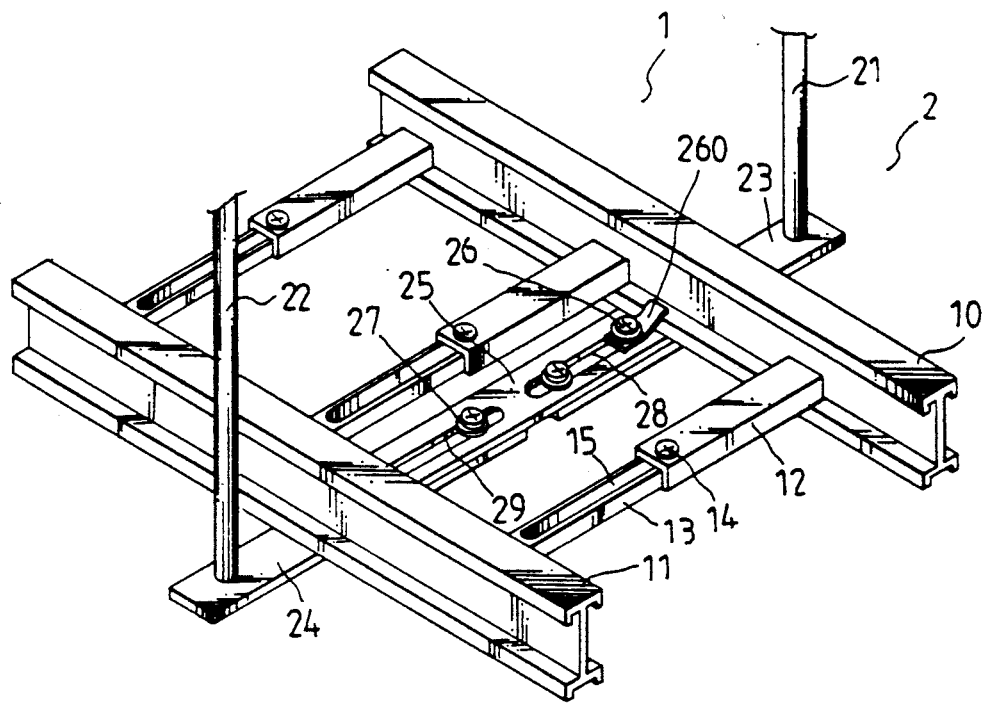
FIG. 1 is a perspective view of an overhead conductor carrier embodying the present invention.
Figure 2:
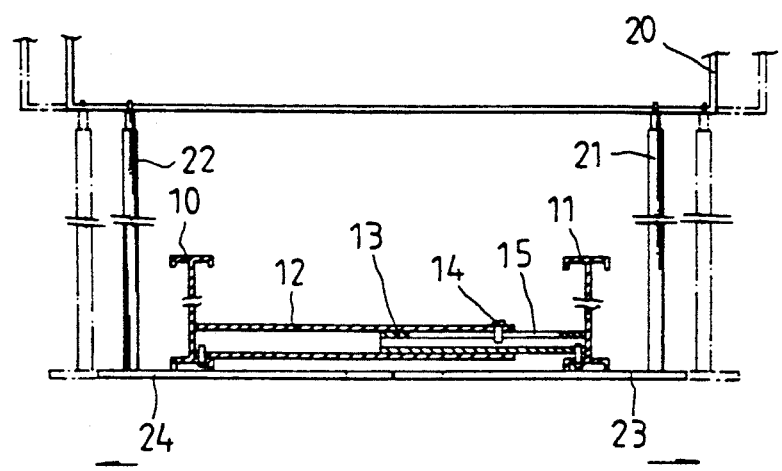
FIG. 2 illustrates that the suspension gear can be bilaterally extended outwards.
Figure 3:
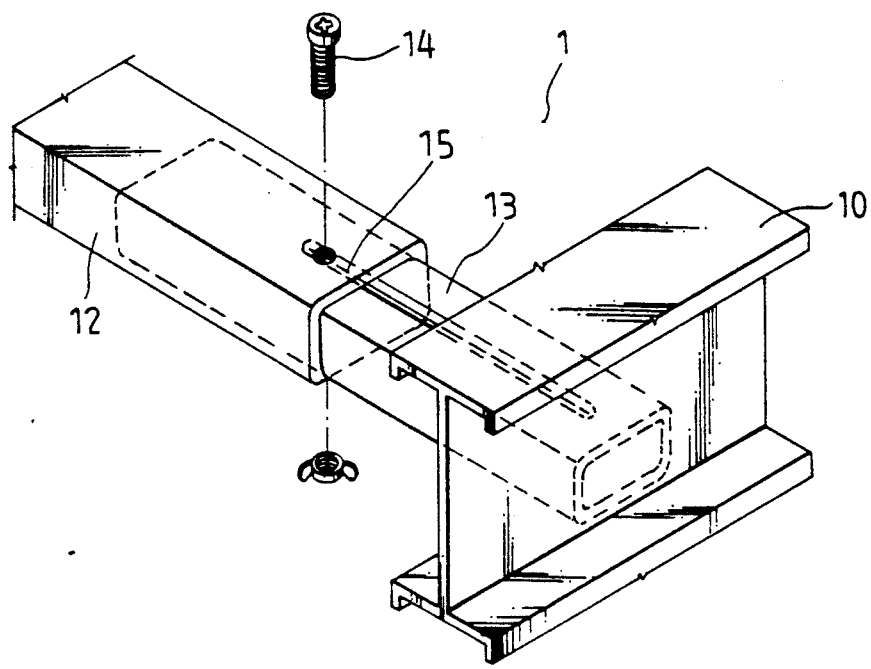
FIG. 3 is a partly perspective assembly view of the conductor carrying frame assembly showing that each extension link is consisted of two rods that slide one inside the other.
Figure 4:
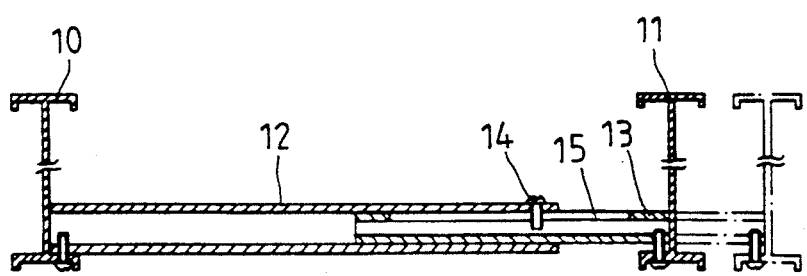
FIG. 4 is a cross section showing that the two symmetrical rails of the conductor carrying frame assembly can be extended outwards relative to each other.
Figure 5:
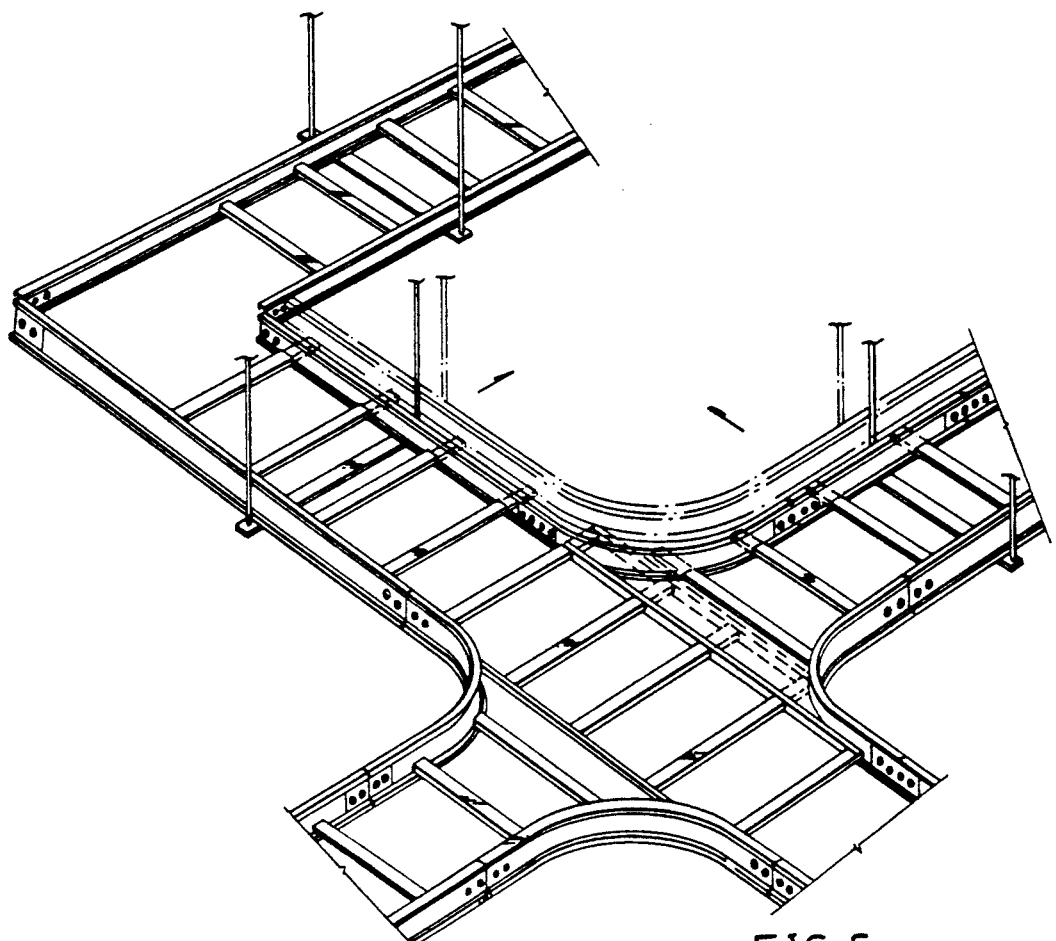
FIG. 5 illustrates an arrangement of an overhead conductor carrier according to the present invention.

Referring to FIGS. 1 and 2, an overhead conductor carrier as constructed in accordance with the present invention is generally comprised of a conductor carrying frame assembly 1 for carrying conductors, and a suspension gear 2 for suspending said conductor carrying frame assembly 1 from the ceiling of a factory building. The conductor carrying frame assembly 1 is comprised of two symmetrical rails 10, 11 connected by a plurality of extension links 12, 13. Each extension link 12, 13 is comprised of two rods 12, 13 that slide one inside the other, wherein the rod 12 is made from a rectangular hollow bar having an adjusting screw 14 at one end, the rod 13 is made from a rectangular bar defining an elongated sliding slot 15 therein in a longitudinal direction. The adjusting screw 14 is inserted through the sliding slot 15. By means of the control of the adjusting screw 14, the rod 13 can be moved into or extended out of the rod 12, and therefore, the range between the two symmetrical rails 10, 11 is adjusted (see FIGS. 3 and 4). The suspension gear 2 comprises an U-shaped cross bar 20 fixedly fastened to the ceiling of a factory building, two suspension rods 21, 22 movably hanging on the U-shaped cross bar 20 at two opposite ends, two lateral stays 23, 24 respectively connected to the two suspension rods 21, 22, and a link block 25 to adjustably connect the two lateral stays 23, 24 together. The link block 25 has two sliding slots 28, 29 longitudinally aligned for adjustably connecting the two lateral stays 23, 24 by adjusting screws 26, 27. The two lateral stays 23, 24 each has one end fixedly secured to either suspension rod 21 or 22 and an opposite end connected to either sliding slot 28, 29 by two adjusting screws 26, 27 respectively, wherein the adjusting screw 26 adjacent to either rail 10 or 11 simultaneously secure the link block 25 to a projecting plate 260 of either rail 10 or 11. By means of the control of the adjusting screws 26, 27, the two lateral stays 23, 24 can be moved inwards or outwards relative to each other so that the range between the two suspension rods 21, 22 is adjusted according to the pitch between the two symmetrical rails 10, 11 of the conductor carrying frame assembly 1 supported thereon (see FIG. 5).

Figure 6:
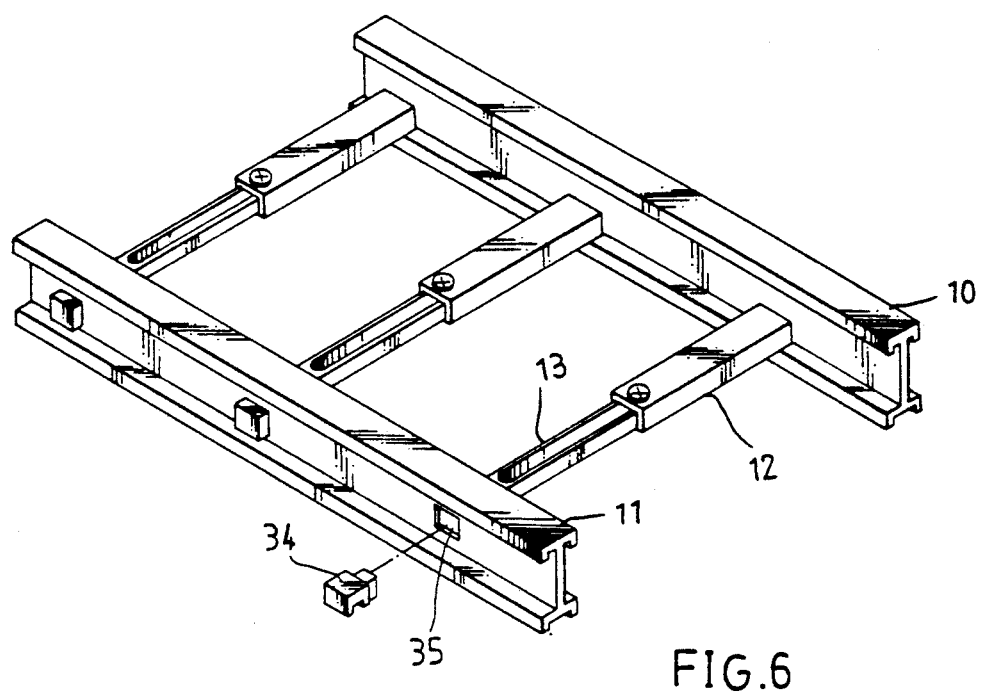
FIG. 6 is a perspective view of the conductor carrying frame assembly showing that each rail has holes for fastening the extension links by connecting elements.

Referring to FIG. 6, the two symmetrical rails 10, 11 each has a plurality of holes 35 equidistantly aligned in a line for fastening the extension rods 12, 13 by connecting elements 34.

Figure 7:
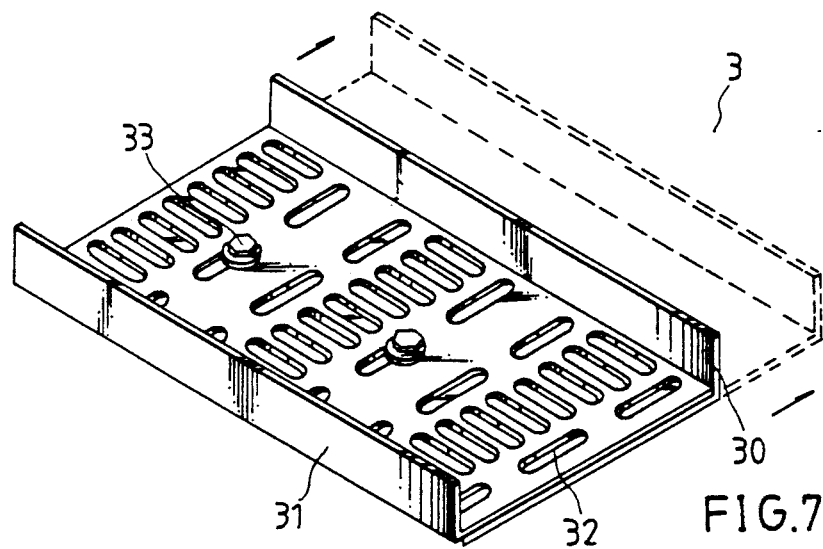
FIG. 7 is a perspective view of an alternate form of the conductor carrying frame assembly.
Figure 8:
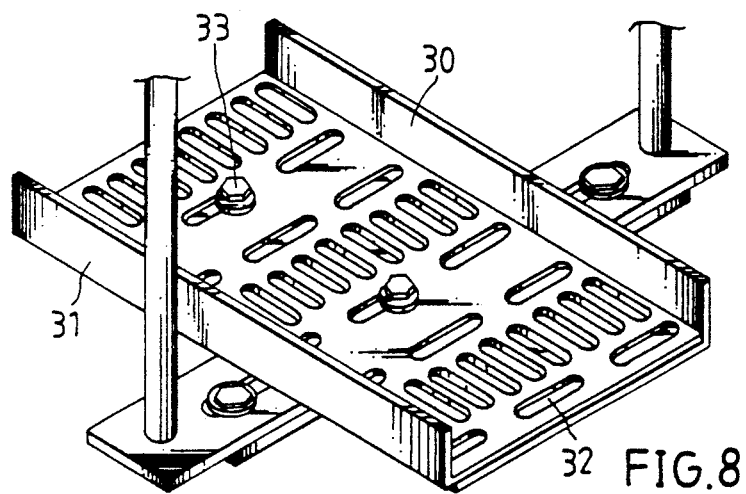
FIG. 8 illustrates that the conductor carrying frame assembly of FIG. 7 is supported on a suspension gear.

Referring to FIGS. 7 and 8, therein illustrated is an alternate form of the conductor carrying frame assembly. In this alternate form, the conductor carrying frame assembly 3 is comprised of two L-shaped plates 30, 31 that lie upon and extend beyond a part of each other. The L-shaped plates 30, 31 each has a plurality of rows of elongated slots 32 respectively aligned and secured by adjusting screws 33. By loosening the adjusting screws 33, the L-shaped plates 30, 31 can be moved inwards or outwards relative to each other so that the total holding space defined therebetween is adjusted according to the quantity of the conductors to be carried.

Figure 9:
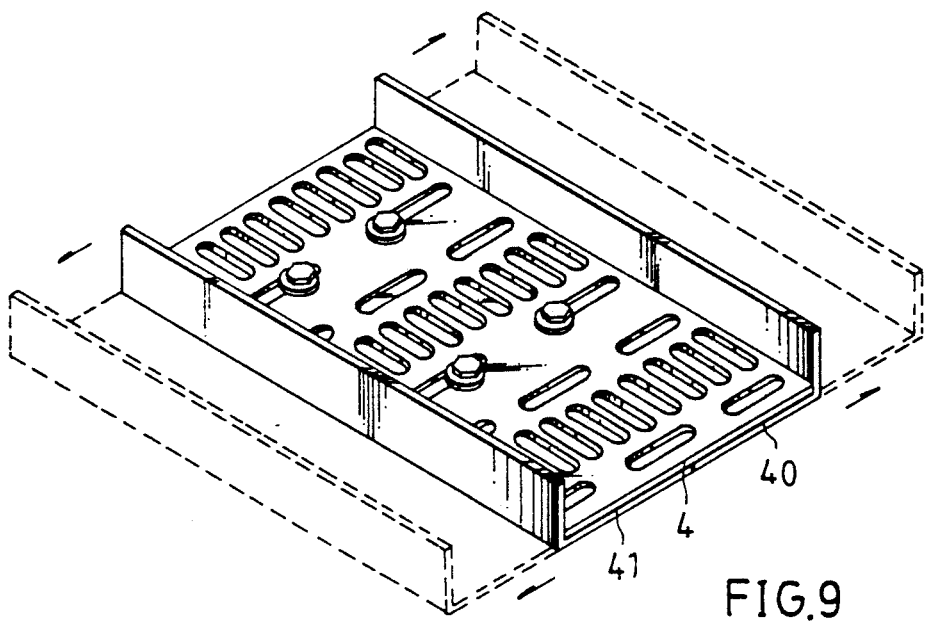
FIG. 9 is a perspective view of another alternate form of the conductor carrying frame assembly.
Figure 10:
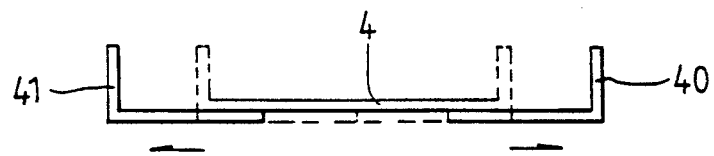
FIG. 10 is a cross section of the conductor carrying frame assembly of FIG. 9, showing that the two L-shaped plates thereof can be bilaterally extended outwards.

Referring to FIGS. 9 and 10, therein illustrated is another alternate form of the conductor carrying frame assembly. In this embodiment, the conductor carrying frame assembly is comprised of two L-shaped plates 40, 41 connected by a connecting plate 4. The structure of the connecting plate 4 and the L-shaped plates 40, 41 are similar to the two L-shaped plates 30, 31 of FIGS. 7, 8, and therefore, the two L-shaped plates 40, 41 can be conveniently moved inwards or outwards to change the holding space therebetween.

Figure 11:
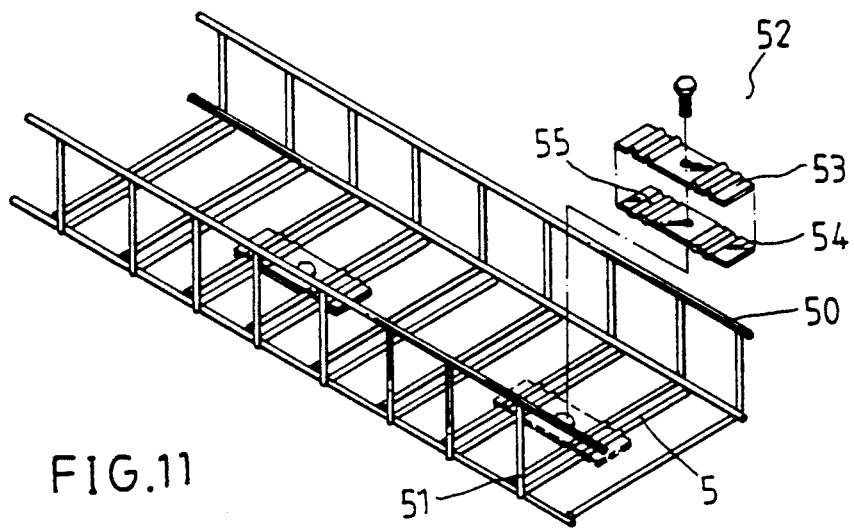
FIG. 11 is a perspective and partly exploded view of another alternate form of the conductor carrying frame assembly.
Figure 12:
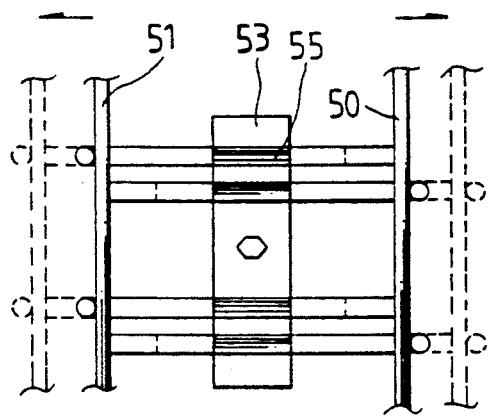
FIG. 12 illustrates that the conductor carrying frame assembly of FIG. 11 can be bilaterally extended.

Referring to FIGS. 11 and 12, therein illustrated is still another alternate form of the conductor carrying frame assembly. In this embodiment, the conductor carrying frame assembly is comprised of two L-shaped railings 50, 51 having a plurality of lateral round rods 5 respectively connected together by a plurality of clamping devices 52 for carrying conductors. Each clamping device 52 is comprised of two clamping plates 53, 54 connected by an adjusting screw 56, wherein the clamping plates 53, 54 each has a plurality of parallel grooves 55 for holding the round rods 5. By loosening the adjusting screw 56, the two L-shaped railings 50, 51 can be relatively extended outwards to increase the holding space defined therebetween for carrying more conductors.

I claim:

1. An overhead conductor carrier, comprising:
   a conductor carrying frame assembly for carrying conductors, said conductor carrying frame assembly comprised of two symmetrical parts extendibly connected together;
   a suspension gear for suspending said conductor carrying frame assembly from a ceiling of a building, said suspension gear comprising a U-shaped cross bar fixedly fastened to a ceiling of a factory building, two suspension rods movably hanging on said U-shaped cross bar at two opposite ends, two lateral stays respectively connected to said two suspension rods and used in bearing said conductor carrying frame assembly, and a link block to connect said two lateral stays together by adjusting screws; and
   wherein said two symmetrical parts can be moved toward or apart from each other to change the space defined therebetween according to the quantity of conductors to be carried.

2. The overhead conductor carrier of claim 1, wherein said conductor carrying frame assembly is comprised of two symmetrical rails connected by a plurality of extension links, said extension links each being comprised of two rectangular tubes that slide one inside the other.

3. The overhead conductor carrier of claim 1, wherein said conductor carrying frame assembly is comprised of two symmetrical, L-shaped plates that lie upon and extend beyond a part of each other, said two L-shaped plates each having a plurality of elongated slots connected by a plurality of adjusting screws, loosening said adjusting screws permitting said two L-shaped plates to be bilaterally extended outwards to increase the holding space defined therebetween.

4. The overhead conductor carrier of claim 1, wherein said conductor carrying frame assembly is comprised of two symmetrical, L-shaped railings connected by a plurality of clamping devices, said clamping devices each being consisted of two corrugated clamping plates connected by an adjusting screw, loosening the adjusting screw of each clamping device permitting said two railings to be bilaterally extended outwards to increase the holding space defined therebetween.

* * * * *